United States Patent [19]

Fjällström

[11] Patent Number: 4,467,508
[45] Date of Patent: Aug. 28, 1984

[54] MACHINE FOR CUTTING OF ARMORED OR REINFORCED HOSES

[76] Inventor: Bengt G. Fjällström, Södra Kungsvägen 9, 52200 Tidaholm, Sweden

[21] Appl. No.: 431,076

[22] Filed: Sep. 30, 1982

[30] Foreign Application Priority Data

Dec. 30, 1981 [SE] Sweden .............................. 8107876

[51] Int. Cl.³ ............................................. B23P 17/00
[52] U.S. Cl. .................................. 29/33 T; 29/426.4; 29/566.1
[58] Field of Search .............. 29/33 T, 50, 566, 403.1, 29/403.3, 426.4, 566.1; 51/5 B, 5 C

[56] References Cited

U.S. PATENT DOCUMENTS 2,604,690  7/1952  Rodder et al. ........................ 29/33 T
3,242,566  3/1966  White ..................................... 51/5 C
3,400,451  9/1968  Pierce ................................ 29/566 X Primary Examiner—Z. R. Bilinsky
Attorney, Agent, or Firm—Wenderoth, Lind & Ponack

[57] ABSTRACT

The invention relates to a machine for cutting of armoured or reinforced hose (3) and particularly steel armoured hydraulic hose (3). The machine is characterized by, that a frame part (13) is firmed attached to a rotable center part (9). The frame part (13) supports a movable cutting device (15), which includes a cutting wheel (17) and a motor (16). The position of the cutting device in relation to a hose, which is intended to be cut, is regulated by means of a motor (24) via a screw (25). Furthermore a movable sensor device or element (21) is arranged, which indicates the position and the wear of the cutting wheel (17) during a cutting operation. The frame part (13) also supports a movable guillotine knife (26). During a cutting operation the center part (9) and the frame part (13) are brought in rotation by means of a cog wheel transmission (10), a cog wheel (12) and a motor (11). Before a cutting operation an armoured or reinforced hose (3) is led through the center part (9) and the frame part (13), where the hose is fixed in a wished position by means of a chuck (31) and a holding device (34). An outer gummed layer and an inner armouring or reinforcing is cut by means of the cutting wheel (17). Lastly an inner gummed layer is cut by means of the guillotine knife (26).

The aim hereby is to provide for a cutting operation in such a way that fragments from the armouring or reinforcing are prevented from following in to the hose during the cutting operation.

1 Claim, 1 Drawing Figure

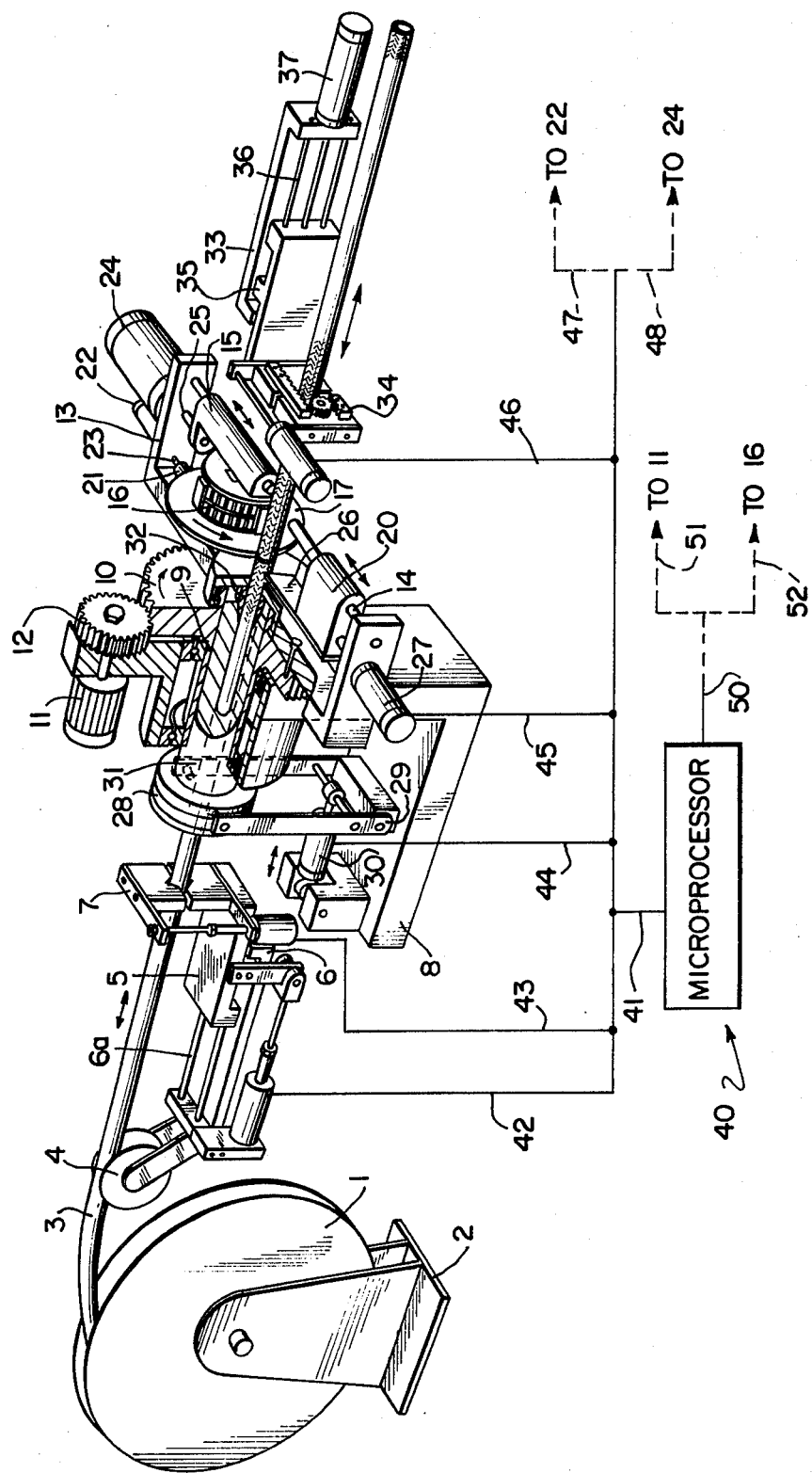

MACHINE FOR CUTTING OF ARMORED OR REINFORCED HOSES

The invention relates to a machine for cutting of armoured or reinforced hoses and particularly the invention relates to a machine for cutting or hoses, such as steel armoured or reinforced hydraulic hoses or hoses with an armouring or reinforcement of other metals or metal alloys.

The cutting device or machine according the invention is not known from the earlier technics.

A head object with the invention is to provide for a machine for cutting armoured or reinforced hoses and preferably steel armoured and reinforced hydraulic hoses in such a way, that fragments from the armouring or the reinforced layer are prevented to follow in to the hoses during a hose cutting operation.

The machine according to the invention is characterized by the appended claims.

The machine according the invention will now be described in detail in the following with reference to the appended drawing, where one form of the machine according the invention is shown only as an example and not in the aim of limiting the scope of the invention.

A hose roll 1 is exchangeably mounted at a frame element 2. At cutting of preferably armoured or reinforced hydraulic hoses 3 the hose 3 is led over a roller 4. A slide 5 is arranged for feeding of appropriated lengths of armoured or reinforced hydraulic hoses 3 through the cutting machine. The slide 5 is arranged at a frame part 6 with steerings 6a for forward and backward movements. The slide 5 supports means 7 for holding of the hose 3 during its feeding forwards towards a cutting position.

In a frame part 8 a rotable centre part 9 is arranged, which centre 9 is provided with a cog wheel transmission 10, which is rotable by means of a motor 11 via a cog wheel 12. The cog wheel transmission 10 is in its turn arranged to bring a frame part 13 in rotation, which frame part 13 supports necessary means for cutting a steel armoured or reinforced hydraulic hose 3. The frame part 13 is arranged with one towards the hose 3, which is intended to be cut, movable device 15, which includes a motor 16 arranged to bring a cutting wheel 17 in rotation. Furthermore one towards the cutting wheel movable sensor device 21 is arranged for sensing of the wearing state of the cutting wheel 17. The degree of the wearing state determines what distance the cutting wheel 17 must be moved towards the hose 3, which is intended to be cut. Furthermore the frame part 13 is arranged with steerings 14, which also support one towards the hose 3 movable fixing device 20, on which fixing device 20 a guillotine knife 26 is attached. A steel armoured hydraulic hose consists preferably of an inner gummed layer, armouring and an outer gummed layer. The cutting wheel 17 is used for cutting of the outer gummed layer and the armouring or reinforcing, while the guillotine is used for cutting of the inner gummed layer.

The sensor device 21, which is arranged for determination of the wear of the cutting wheel 17, is moved or operated towards the wheel 17 by means of a motor 22 via a screw 23.

The rotable cutting device 15 is moved towards and from the hose 3 during a cutting operation by means of a motor 24 via a screw 25.

The movable guillotine 26 is guided via steerings 14 by means of a cylinder 27.

The armoured hose 3 is passed through an exchangeable steering 28, which is moved towards and from the centre part 9 by means of a lever 29 arm and a cylinder 30. An exchangeable chuck 31, which is preferably provided with a hollowed, conical and compressable cushion gum 32 in its front end, is provided for holding of the hose 3 during a cutting operation.

A feeding forward and out of the hose part 3 is effected by means of a slide 33, which is movable at a holder 35 via steerings 36. The holder 35 includes means 34 for holding of the hose 3 during the cutting and the out-feeding operation. The slide 33 is operated by means of a cylinder 37.

A particle collector (not shown) is applicated or arranged in the area of the cutting wheel 17 to follow the rotation of the frame part 13. Because of that a decrease in pressure is achieved in the area of the cutting wheel 17 the particles, which are abraded during the cutting operation, will be suck up and collected.

A transport path for cut parts of hoses 3 is arranged.

The steering of the forward feeding, the cutting and the out-feeding operations is achieved by means of a micro processor, in which the diameter of the hose, the lengths of the hose parts and number of intended cuttings are programmed to provide for an automatic operation for cutting of especially steel armoured hydraulic hoses.

The machine or device according the invention can be modified in several ways without departing the scope of the invention, which will be evident from the appended claims.

I claim:

1. A machine for cutting armored or reinforced hose, particularly a steel armored or reinforced hydraulic hose of the type including outer and inner layers having therebetween an armoring or reinforcing layer, said machine comprising:
   a center member mounted for rotation and through which is passed a hose to be cut, said center member having fixed thereto a cog wheel transmission;
   a frame fixed to said center member;
   means for feeding the hose to be cut into said center member and said frame, said feeding means comprising a holder for holding the hose, a slide supporting said holder, a cylinder for moving said slide, said holder and the hose held by said holder into said center member and said frame to a cutting position, a guide through which passes the hose, and a cylinder for moving said guide toward and away from said center member;
   means for cutting through the outer and armor layers of the hose during a cutting operation and comprising a grinding wheel mounted on said frame, a motor for rotating said grinding wheel, and first motor and screw means for moving said grinding wheel along the frame toward and away from the hose;
   means for detecting the degree of wear of said grinding wheel and comprising a sensor and second motor and screw means for moving said sensor toward and away from said grinding wheel to sense the relative position of the periphery thereof;
   means for cutting through the inner layer of the hose during a cutting operation and comprising a knife fixed to a support device, and a cylinder for moving said support device and said knife along guide rods on said frame toward and away from the hose;

means for rotating said center member and said frame, and thereby said grinding wheel and said knife, about said hose during a cutting operation, said rotating means comprising a cog wheel mounted for meshing engagement with said cog wheel transmission of said center member, and a motor for rotating said cog wheel;

means for holding the hose during the cutting operation and comprising a chuck extending through said center member and held by said guide;

means for removing a cut length of hose from said machine and comprising a gripper for holding the cut length of hose, a holder member supporting said gripper and cylinder means for moving said holder member, said gripper and the cut length of hose held thereby away from the frame; and microprocessor means operatively connected for controlling automatically the operation of said feeding means, said outer and armor layer cutting means, said detecting means, said inner layer cutting means, said rotating means, and said removing means.

* * * * *